United States Patent [19]

Vodra

[11] 4,063,705

[45] Dec. 20, 1977

[54] VACUUM FORMING MOLD

[76] Inventor: Richard J. Vodra, P.O. Box 353, Wooster, Ohio 44691

[21] Appl. No.: 677,409

[22] Filed: Apr. 15, 1976

Related U.S. Application Data

[63] Continuation of Ser. No. 514,198, Oct. 11, 1974, abandoned.

[51] Int. Cl.² .............................................. B29C 1/00
[52] U.S. Cl. .................................. 249/80; 249/116; 425/388; 425/DIG. 60; 204/6; 156/150
[58] Field of Search ................. 425/388, 85, DIG. 60; 249/97, 79, 80, 114, 116; 204/6; 156/150

[56] References Cited

U.S. PATENT DOCUMENTS

| | | | |
|---|---|---|---|
| 3,503,856 | 3/1970 | Blackmore | 204/6 |
| 3,640,666 | 2/1972 | Jope et al. | 425/388 X |
| 3,687,594 | 8/1972 | Medendorp | 425/388 |
| 3,753,830 | 8/1973 | Cruckshank et al. | 425/388 |
| 3,942,934 | 3/1976 | Momiyama | 425/388 X |
| 3,947,206 | 3/1976 | De Ligt et al. | 425/388 |

FOREIGN PATENT DOCUMENTS

| | | | |
|---|---|---|---|
| 1,130,584 | 3/1962 | Germany | 249/79 |

Primary Examiner—Robert L. Spicer, Jr.
Attorney, Agent, or Firm—Watts, Hoffmann, Fisher & Heinke Co.

[57] ABSTRACT

A mold for vacuum forming plastic sheet and the like and a method of making the mold. A relatively thin mold shell provides a forming surface through which small apertures open to exhaust air to vacuum form a heat-softened plastic sheet. Small manifold conduits behind the forming surface connect the apertures to a source of vacuum. The mold area subtended by the manifold conduits is substantially less than the area of the entire forming surface, thereby substantially limiting the force exerted upon the forming surface by the pressure differential created during vacuum forming of a plastic sheet. The mold is preferably made by electroforming a metallic shell on a pattern, and is apertured in a desired pattern. Filaments are advantageously used to form the apertures during electroforming. A low melting point material is applied to the back of the shell in a manifold pattern to connect the apertures and a metallic layer is electroformed to the back of the shell. The material forming the manifold pattern is then melted and removed.

2 Claims, 5 Drawing Figures

VACUUM FORMING MOLD

This is a continuation of application Ser. No. 514,198, filed Oct. 11, 1974, now abandoned.

BACKGROUND OF THE INVENTION

1. Field of the Invention

This invention relates to a mold for vacuum forming plastic sheets and to a method of making such a mold.

2. Prior Art

The vacuum forming of heat-softened sheets of plastic material is well known. Molds suitable for such vacuum forming are typically porous or have holes in a forming surface. A vacuum applied behind the forming surface evacuates air from between the surface and a heat-softened plastic sheet to bring the sheet into conformance with the surface. Tubes for the circulation of cooling fluid may be used in conjunction with the mold to cool the forming surface and the formed plastic sheet. The holes and cooling tubes must be located to avoid interference. For example, where the tubes are cast into the back of a mold, care must be used in drilling the evacuation holes to avoid puncturing a tube.

Typically, the forming surface serves as the top or front of a vacuum chamber that can be evacuated as desired to form and cool heat-softened sheets of plastic. The forming surface must either be quite thick to provide inherent strength or must be reinforced across the back to resist the pressure differential on opposite sides created by the vacuum within the chamber. By way of example, it is known to make porous vacuum molds of refractory material cast into shape and having a substantial thickness to assure rigidity. This construction has the disadvantage of becoming plugged both at the forming surface and within the body of refractory material from dirt, plasticizer and the like. It also makes temperature control at the surface of the mold difficult because the material is usually a poor heat conductor and has substantial mass.

It is also known to use so-called shell molds that are thin relative to the forming area. Such molds can be made, for example, from cast metal, typically aluminum, with integral reinforcing ribs and cooling tubes. Holes are then drilled through the mold and the mold is backed by a vacuum chamber. As another example, such molds can be made by electroforming a sheet-like mold over a pattern of the desired shape. A pattern of holes can then be drilled through the shell or can be formed at the time of electroforming by the process disclosed in the copending application, Ser. No. 241,917, filed Apr. 7, 1972, referred to above. Such shell molds have the inherent disadvantages of being structurally weak because of their thinness and require heavy reinforcement behind the mold to withstand the large and repetitive pressures exerted against the forming surface of the mold when a vacuum is created behind the mold. Cooling tubes are utilized on the back surface of the mold or in the mold body for temperature control, but as already indicated, these must be located to avoid interference with the vacuum holes. This can result in poor temperature control across the mold surface and in many instances the tubes become punctured during the drilling of holes through the mold.

It will be appreciated that temperature control across the surface of a mold is important not only to establish advantageous production cycles, but also to assure the desired physical characteristics of the formed plastic sheet, including the quality of any embossed surface formed on the sheet by the mold surface. Because a sheet of hot plastic, generally between 300° and 500° F., is impressed against the surface of a mold every few seconds in use, the cooling arrangement must not only remove heat from the plastic but also must prevent buildup of residual heat in the mass of the mold and supporting structure. Thus, uniform surface temperature is typically very marginal in molds of large mass or where the cooling flow is not advantageously located across the back of the forming surface.

SUMMARY OF THE INVENTION

The present invention overcomes the above and other disadvantages of known molds for vacuum forming and in addition provides a novel method of fabricating a mold. Molds embodying the present invention are comprised of a thin shell of large forming area and provide evacuation at the forming surface through small apertures without subjecting the major area of the mold to a pressure differential. Thus, the mold and, hence, its contour, is not subjected to forces that require it to be structurally capable of resisting large forces applied to one side. Accordingly, it need not be inherently strong or thick and need not be reinforced beneath the forming surface with ribs or the like.

Briefly, the above characteristics are achieved by the use of tubular conduits behind the forming surface, preferably integral with the shell, that subtend only a limited portion of the forming surface. The conduits communicate with apertures or holes in the forming surface of the mold, like a manifold, and can be connected to a vacuum source to create a pressure differential between the forming surface and a sheet overlying the surface. As a result, the relatively thin mold or shell is not subjected as a whole to a pressure differential on opposite sides, but rather only to differentials isolated to limited areas subtended by the conduits. Typically, less than a major portion of the forming surface is subtended by the conduits and most preferably only a relatively minor portion is. Through the use of conduits of small cross section, as little as 10% or less of the forming surface area might be subtended by the area of the tubular conduits connecting the apertures or holes in the surface.

Cooling tubes are associated with the back of the mold. They are located without regard to the location of the evacuation conduits or the apertures, since the holes will preferably be preformed or in any event will not extend through the entire shell but only a distance inward from the forming surface sufficient to communicate with the tubular conduits.

The thin shell construction utilized with this invention eliminates any problem of temperature buildup due to a heat-sink effect of the mold or mold reinforcing mass. Where the shell is made of metal, the high conductivity assures even temperature and efficient cooling or even thermally cycled between consecutive formings.

In the preferred construction, the mold shell is electroformed of metal, such as nickel, and is a lamination. One lamina of the structure serves as the forming surface of the mold and is apertured. A second lamina serves as a backing and is contoured to provide a gap of selected contour between the laminae. The contour provides a network of tubular conduits that follows the pattern of the apertures or holes in the first lamina and thereby forms integral interconnected evacuation channels. By connecting this network to a source of pressure differential, i.e., a vacuum source or a pressure source, either a vacuum can be created between the forming surface and a plastic sheet to draw the sheet into contact with the mold, or pressure can be created to remove, i.e., blow off, a formed sheet from the mold.

In essence, with the above-described construction, a vacuum is created within limited areas of the shell mold itself, rather than on one side of the mold, thereby avoiding the crushing effect that occurs if a vacuum is applied to one side of the mold. With external pressures equal on opposite sides, the only stress to the mold as a whole is the negligible weight of the plastic sheet. The vacuum-created pressure differential applied over the limited area subtended by the network of evacuation channels is readily resisted by the thickness of the laminae and no over-all deformation of the mold occurs. Thus, the mold can be formed of a relatively thin unreinforced shell. Because of the lack of deformation, there is no fatigue from the flexing effect normally produced by the repeated impact of forming pressure when a pressure differential is produced on opposite sides of a thin mold. The force of such pressure from drawing a full vacuum, when applied over an entire area, is in excess of one ton per square foot and readily flexes and distorts a thin mold having a large surface.

For efficient cooling and temperature control, coolant lines or tubes are secured, as by soldering, to the back of the mold in any desired pattern without interfering with the network of evacuation channels. Alternatively, the shell may be jacketed on the side opposite from the forming surface. In either case, the coolant flow is in close proximity to the forming surface. That, coupled with the use of a thin, heat conducting, mold material, eliminates hot spots, prevents buildup of residual heat, and increases the rate at which parts can be molded.

A preferred method of producing a mold constructed as described, is by electroforming a first shell lamina of metallic material onto a pattern of desired shape. If desired, surface embossments of texture, pattern, and the like can be produced in what is to be the forming surface of the mold by providing the desired surface on the pattern. Apertures, i.e., holes, are either drilled through the lamina or created during electroforming by the use of dielectric filaments that project from the pattern. A low melting point substance such as wax is then applied on the back side of the lamina, i.e., the side opposite the forming surface, in a pattern or network of lines that cover and interconnect the holes. The back side and network of lines is then plated over to form a second metallic lamina integral with the first to produce a lamination that forms the shell mold. The substance is then melted and removed from between the laminae to form gaps that act as conduits to communicate the holes with a vacuum source.

In addition to the advantages already indicated, including the cost advantage of eliminating the reinforcing understructure, it will be appreciated that this construction reduces the vacuum requirements because of the small volume of air in the network of the exhaust conduits. This results in a quicker evacuation and, hence, improved surface embossment and texture in the finished plastic product.

The above and other features and advantages will become more apparent as the invention becomes better understood from the detailed description that follows, when considered in connection with the accompanying drawings.

DETAILED DESCRIPTION OF PREFERRED EMBODIMENTS

Figure 1:
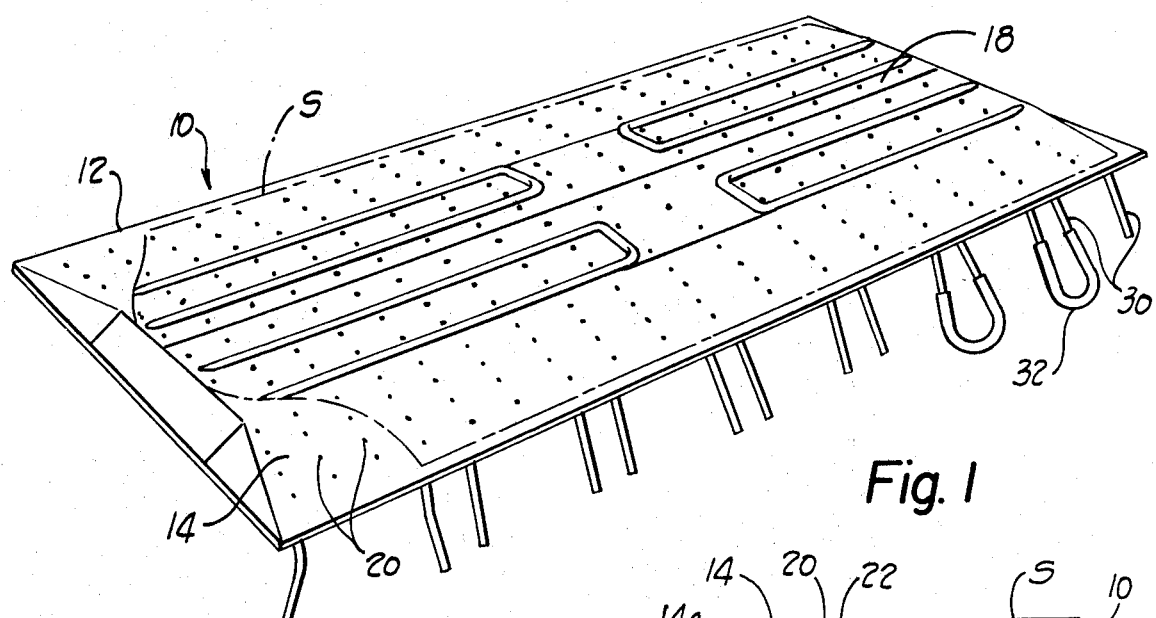
FIG. 1 is a perspective view of a mold embodying the present invention.
Figure 2:
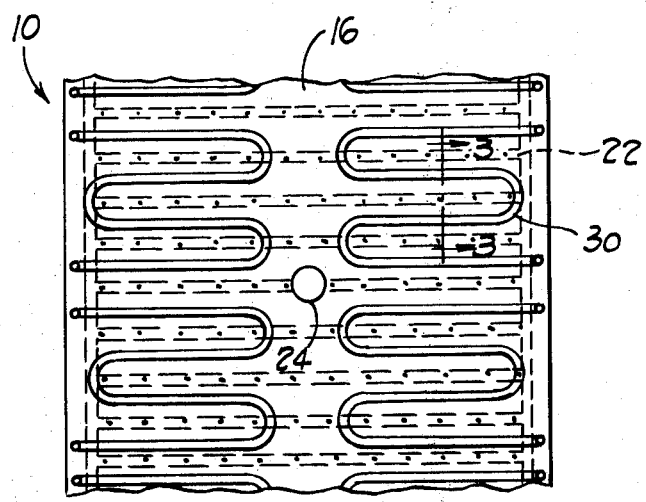
FIG. 2 is a plan view of the back surface of the mold of FIG. 1.
Figure 3:
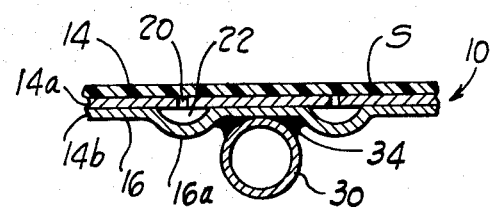
FIG. 3 is a partial longitudinal sectional view taken along the line 3—3 of FIG. 2.

With reference now to the drawings, a preferred embodiment of a mold constructed in accordance with the present invention is indicated at 10 in FIGS. 1-3. The mold is comprised of a thin plate or shell 12 with a forming or shaping surface 14 and a back surface 16. The front or shaping surface in this instance includes surface embossments 18. The shape, contour and surface embossments of the mold 10 shown are suitable to produce a molded plastic sheet for use as a liner, such as a door liner, for the interior of an automobile. As shown by the drawings, the shell 12 is thin relative to the area of the forming or shaping surface 14.

A plurality of small apertures or holes 20 are in the forming surface 14, through which air can be withdrawn to draw a plastic sheet onto the forming surface, or through which air can be forced to blow a formed product off the mold. The holes 20 are large in number and relatively closely spaced throughout that area of the mold to be covered by a plastic sheet, which is indicated in phantom by reference numeral S; yet the holes are small enough not to mark the sheet and to provide sufficient flow resistance to permit location in an area not covered by the sheet, without significantly reducing the ability to create a vacuum.

Small tubular conduits 22 run in a connected pattern through the shell 12 in communication with the apertures 20. These conduits connect the apertures with a source of reduced pressure or increased pressure. For example, through suitable controls the conduits can be selectively connected to a vacuum pump or evacuated reservoir, to draw the sheet S onto the forming surface, or to a pressure supply to blow off the sheet after forming. The conduits, being interconnected, can be connected to the source of vacuum or pressure through the port 24 as shown in FIG. 2.

As illustrated in FIG. 3, the conduits 22 are accommodated within the thin shell by a bulge 16a in the back surface 16. The apertures 20 extend at intervals into the conduits 22. The conduits follow the pattern of the holes, as shown in FIG. 2, which pattern need not be regular or geometric. As shown, the conduits subtend an area small relative to the entire surface area 14. In addition, the cross sectional area of the conduits 22 is small, resulting in a small volume within the conduits. This small volume assures rapid evacuation and quick response at the surface of the mold to the establishment of a pressure differential at the port 24.

In the preferred embodiment the shell 12 is of metal, preferably nickel, and is constructed as a lamination in the sense that the total thickness is created as two separate layers. The two laminae or layers are indicated at 14a, 14b, with the conduits 22 lying between the layers. The thickness of each layer or lamina is sufficient to withstand a high or complete vacuum throughout the limited area of the conduit. As will be described in more detail subsequently, the layers are advantageously formed by electrodeposition. It will be understood, in the broader aspects of the invention, conduits could be formed in other ways to subtend a limited area of the forming surface, but the present construction affords substantial advantages in fabrication.

Tubes 30 are applied to the back surface 16 of the shell 12 to carry heat transfer fluid and to control the temperature of the forming or shaping surface 14. As shown, the tubes 30 are applied in separate sections. They are typically of copper material and are connected as by flexible tubing 32 where separate supply to the different sections is not required. Separate sections, of course, provide flexibility of temperature control. The tubes are located for temperature control without regard to the pattern of the conduits 22 or the holes 20, and are secured by soldering to the back surface, as indicated at 34 in FIG. 3.

Figure 4:
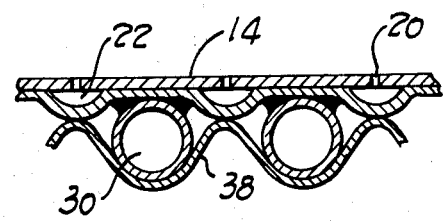
FIG. 4 is a longitudinal sectional view similar to FIG. 3 but illustrating a modified embodiment of the mold.

A modification of the embodiment shown in FIGS. 1-3 is illustrated in FIG. 4. Heat transfer in the embodiment of FIG. 4 is enhanced by the use of a heat conductive plate 38 over the tubes 30, contoured to make contact with the back surface 16 of the shell 12 between the tubes 30. A material such as copper is especially suitable and serves to more rapidly transfer heat from areas between the cooling coils or tubes to the circulated heat transfer fluid.

Figure 5:
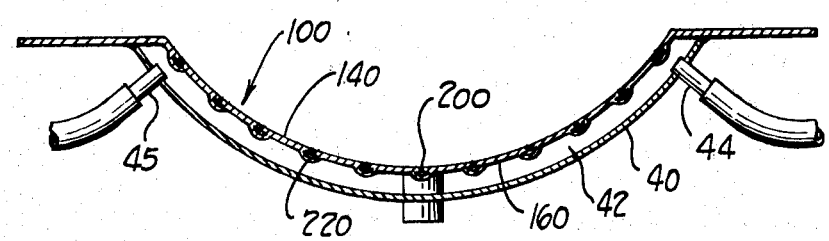
FIG. 5 is a transverse sectional view of another embodiment of a mold of a different shape from the mold of FIG. 1 and incorporating modified cooling structure.

A modified construction of a mold 100 embodying the present invention is shown in FIG. 5 of the drawings. The mold 100 includes a shell or thin plate 120 of similar construction to the shell 12. A front or shaping surface 140 is concave and the back surface 160 is convex. A cooling jacket 40 extends behind the convex back surface 160, in spaced relation to provide a chamber 42 in which heat transfer fluid can be circulated to bathe the back surface 160 with the fluid for temperature control. An inlet 44 and an outlet 45 to and from the jacket 40 facilitate the introduction, circulation and withdrawal of heat transfer fluid. The mold 100 includes apertures 200 connected by conduits 220, similar to the apertures 20 and conduits 22 of the mold 10.

In the preferred embodiments of this invention, the apertures 20 of the shell 12 are sufficiently small to not mark the hot plastic drawn against the forming surface. For example, the apertures are preferably between 0.05 and 0.002 inch in diameter. They may be arranged in any suitable pattern, but as shown are spaced in rows approximately ¾ inch apart and at such spacing will typically provide adequate evacuation beneath the entire surface area of the sheet S. With rapid and complete evacuation, as provided by a large number of apertures 20 and a small volume of air within the conduits 22, good fidelity of the formed surface to the contour and pattern of the mold is assured, because the sheet will be drawn quickly and tightly against the forming surface while still hot and soft.

The interconnected conduits 22, as shown, subtend substantially less mold area than the forming area of surface 14. Typically, the area subtended by the conduits 22 will be no more than one-half of the forming surface area and is less than one-third in the embodiment shown. They can subtend as little as one-tenth or less of the mold area.

The preferred method of forming the mold 10 is through an electroforming technique. With this technique, a model or pattern is first provided with a surface contour and with embossments as desired in the finished product. The model or pattern is rendered electrically conductive by coating it with a suitable material, such as graphite, silver or the like. A suitable metal, for example, nickel, is then deposited electrolytically on the coated pattern to produce a shell of the desired thickness. For example, the shell first produced may be approximately ⅛ inch thick. Although the apertures 20 can be subsequently drilled, this is difficult where the apertures are extremely small in diameter. Most advantageously, the apertures may be formed by attaching dielectric filaments to the pattern prior to the step of electrodepositing the mold shell. The filaments may be made of any suitable nonconducting material, such as nylon, glass, natural hair, bristles, and the like. These filaments extend from the pattern at the desired location of the holes or apertures. The filaments are subsequently withdrawn from the electroformed shell, providing holes of the desired diameter.

The pattern on which the shell is made may be made of any suitable material, for example, an epoxy resin, wax, soft metal, or the like. The conductive material, such as silver, may be applied by spraying, painting, chemical reduction, or other ways. Where filaments are used to form the holes, they may be simply inserted into holes formed in the pattern. After the pattern has been coated and the filaments attached, a metal such as nickel is deposited by electroforming and the resulting shell is then removed from the model.

After the shell has been made (portion 14a of the laminated shell 14) and the holes 20 formed, a low melting point substance is applied to the back surface, where it is desired to provide the evacuation conduits 22. A suitable low melting point substance is wax. This wax can either be painted onto the back surface or it can be applied in the form of strips having the desired width and thickness. For example, lines can be painted with wax in a thickness of 0.010 to 0.015 inch thick. When a larger conduit volume is desired, a thin strip of wax, for example, 1/16 inch thick and up to 1 inch in width can be applied. If desired, such a strip can cover two rows of closely adjacent holes. Wax strips of other form or dimension can also be used, such as strips that are half round in cross section, to provide the conduit shape shown in FIGS. 3 and 4.

The back surface 16 and the applied wax or other low melting point surface is then silvered over for conductive purposes and to assure bonding, and a second layer 14b of metal is electrodeposited. This layer may be somewhat thinner than the first, for example, a 1/16 inch layer of nickel is adequate to resist collapse of the conduits 22 when subjected to a vacuum. The mold is then heated to melt the low melting point substance, such as wax, and the substance is removed, leaving the interconnected conduits 22, ported at 24.

The above described method of fabrication not only provides an integral construction in which the conduits 22 are essentially within the shell 12, but also achieves good bonding between the material forming the conduit and the material forming the front forming surface of the mold. This bonding is especially important when positive pressure is applied to the conduit to blow a molded product off of the mold. Such pressures may reach 20 to 50 pounds per square inch.

The copper cooling tubes 30 are then secured to the back surface of the mold, by applying solder along the lengths of the tubes. The location of the tubes is without regard to the conduits 22 because of the relatively small depth of the conduits.

By way of a specific example of the invention, a mold was made by using an epoxy resin model or pattern having a simulated leather grain surface. The pattern was painted with a silver lacquer to provide a conductive coating which was approximately 0.0003 inch in thickness. A dental drill was used to form holes approximately 0.0003 inch in diameter in the pattern. Nylon filaments approximately ⅛ inch long were inserted in the holes by hand to project from the coated surface of the pattern. A nickel shell 14a was then formed around the pattern by electrolytic deposition. The electro-forming operation was carried out using a nickel sulfamate solution as the electrolyte, a nickel anode, and a current density of approximately 40 amperes per square foot. The mold shell had a relatively uniform thickness of approximately ⅛ inch. Upon removal from the electrolyte bath, the Nylon filaments were withdrawn from the mold shell by hand to provide the evacuation holes 20 through the mold surface 14.

Wax in the form of half round strips 3/16 inch wide and 3/32 inch deep were affixed to the back surface of the shell portion 14b in a pattern essentially as shown in FIG. 2, approximately ¾ of an inch apart. The wax was then painted over with a silver lacquer to provide a conductive coating which was approximately 0.0003 inch in thickness. The back surface of the shell was activated and then the shell 14a and coated wax was plated to produce a layer 14b of nickel approximately 1/16 inch in thickness, in the same manner as described. Upon removal from the electrolyte bath, the shell was heated and the wax melted and removed from between the layers.

It will be apparent from the foregoing that the present invention provides a mold having the advantages already described above. Although the invention and especially the preferred embodiments have been described with particularity, it will be understood that various modifications or alterations may be made therein without departing from the spirit and scope of the invention set forth in the appended claims.

I claim:

1. A mold for vacuum forming, comprising a lamination of metallic layers at least one of which is electroformed, with interconnected narrow and elongated gaps between two laminae and along predetermined paths, said gaps serving as fluid-conducting passages and said lamination having a surface portion defining a forming area that is then relative to the extent of the forming area and centrally unsupported, the lamination being thicker along the predetermined paths than elsewhere by an amount substantially equal to the height of the gaps; apertures, small with respect to the forming area, extending through a metallic layer and communicating directly between said surface portion and said passages; said passages subtending substantially less than the entire forming area; means to connect said passages to means for changing the fluid pressure within the passages; and means to circulate heat exchange fluid in heat-conductive relationship with said lamination behind said forming area.

2. A mold for vacuum forming, comprising an electro-formed lamination of metallic layers with interconnected narrow and elongated gaps between two laminae and along predetermined paths, said gaps serving as fluid-conducting passages and said lamination having a surface portion defining a forming area that is thin relative to the extent of the forming area and centrally unsupported; said laminations and gaps being formed by providing a metallic shell, applying a material having a melting point substantially lower than that of the shell on one side of the shell in a pattern of the predetermined paths, electro-forming a metallic layer onto the one side and onto the material to form a lamination with the shell, and thereafter melting the material and removing it from between the laminations; the lamination being thicker along the predetermined paths than elsewhere by an amount substantially equal to the height of the gaps; aperatures, small with respect to the forming area, extending through a metallic layer and communicating directly between said surface portion and said passages; said aperatures being formed by attaching dielectric filaments to a pattern, electro-depositing the metallic shell upon the pattern and then withdrawing the filaments from the shell; said passages subtending substantially less than the entire forming area; means to connect said passages to means for changing the fluid pressure within the passages; and means to circulate heat exchange fluid in heat-conductive relationship with said lamination behind said forming area.

* * * * *